United States Patent [19]

Stephens

[11] Patent Number: 4,710,426

[45] Date of Patent: Dec. 1, 1987

[54] SOLAR RADIATION-CONTROL ARTICLES WITH PROTECTIVE OVERLAYER

[75] Inventor: Robert K. Stephens, Windham, N.H.

[73] Assignee: Polaroid Corporation, Patent Dept., Cambridge, Mass.

[21] Appl. No.: 555,520

[22] Filed: Nov. 28, 1983

[51] Int. Cl.⁴ .................. B32B 15/08; B32B 27/06; B32B 27/36

[52] U.S. Cl. .................. 428/336; 350/1.7; 350/164; 428/421; 428/422; 428/447; 428/450; 428/458; 428/463; 428/469

[58] Field of Search ............... 428/458, 421, 215, 336, 428/447, 450, 463, 469, 483, 422; 156/99; 350/1.7, 164

[56] References Cited

U.S. PATENT DOCUMENTS

| 3,118,781 | 1/1964 | Downing | 428/215 |
| 3,290,203 | 12/1966 | Antonson et al. | 428/336 |
| 3,308,004 | 3/1967 | Rouault | 428/458 |
| 3,781,077 | 12/1973 | Groth | 350/1.7 |
| 3,849,244 | 11/1974 | Groth | 156/99 |
| 4,047,804 | 9/1977 | Stephens | 350/164 |
| 4,066,814 | 1/1978 | Chiklis | 428/421 X |
| 4,226,910 | 10/1980 | Dahlin et al. | 428/336 |
| 4,337,990 | 7/1982 | Fan et al. | 350/1.7 |
| 4,414,254 | 11/1983 | Iwata et al. | 428/458 X |
| 4,450,201 | 5/1984 | Brill et al. | 428/458 X |

FOREIGN PATENT DOCUMENTS 2012943 8/1979 United Kingdom ............... 428/458

Primary Examiner—Thomas J. Herbert
Attorney, Agent, or Firm—Louis G. Xiarhos

[57] ABSTRACT

Radiation-control sheet materials are disclosed, these materials including a transparent support material, an infrared radiation-reflecting layer and a protective polymeric layer therefor substantially transmissive of infrared radiation and having therein or in a layer contiguous thereto an adhesion-promoting isocyanate. The protective polymer layer provides anti-abrasion and anti-corrosion protection and is effectively bonded by the adhesion-promoting isocyanate.

28 Claims, 2 Drawing Figures

SOLAR RADIATION-CONTROL ARTICLES WITH PROTECTIVE OVERLAYER

BACKGROUND OF THE INVENTION

This invention relates to radiation control sheet materials adapted to window and other solar applications. More particularly, it relates to radiation control sheet materials transmissive of visible light and selectively reflective of infrared radiation.

Various window-pane and like articles exhibiting visible light transmission and infrared (heat) reflecting properties have been described; and examples of such articles can be found in U.S. Pat. Nos. 3,781,077 (issued Dec. 25, 1973 to R. Groth); U.S. Pat. No. 3,849,244 (issued Nov. 19, 1974 to R. Groth); and U.S. Pat. No. 3,308,004 (issued Mar. 7, 1967 to P. Rouault). Typically, such articles will include a transparent support carrying a metallic or metalloid or semiconductive heat-reflective layer transmissive of visible and other solar radiation and reflective of infrared (heat) radiation. In addition to a heat-reflective layer, such an article may be provided with one or more layers of highly refractive dielectric material or polymeric or other protective layers for abrasion and corrosion resistance. The application of such additional layers presents certain requirements tending to make the production of such articles more costly or difficult to fabricate and in some cases resulting in radiation control sheet materials of reduced efficiency.

The application to a heat-reflecting layer of, for example, a low-reflection magnesium fluoride protective layer, requires the use of substantial heating for development of suitable hardness and durability. This requirement dictates the use of a glass substrate capable of withstanding the required heating and effectively negates the use of less costly and otherwise suitable plastic sheet materials. The application of a polymeric material as a protective layer may also be attendant with certain difficulties related to the manufacture or use of the desired radiation-control sheet material. For example, the polymeric protective layer may be inadequately bonded, such that handling during manufacture or use of the desired article may result in delamination or separation of the polymeric protective layer or other defects attributable to adhesion failure.

SUMMARY OF THE INVENTION

It has been found that a radiation control sheet material comprising a transparent support and an infrared radiation-reflecting means can be provided with an adherent and protective layer by utilizing (as such protective layer) a polymeric layer substantially transmissive of infrared radiation and by bonding the layer with an effective amount of an isocyanate adhesion-promoting agent. Accordingly, the present invention provides a radiation control sheet material comprising a transparent support carrying an infrared radiation-reflecting means and, as a protective layer for said radiation control sheet material, a polymeric layer substantially transmissive of infrared radiation, said polymeric layer having therein or as a layer contiguous thereto an effective amount of isocyanate adhesion-promoting agent. The protective polymeric layer can be conveniently applied and permits the production of radiation control sheet materials which combine superior physical properties and optical efficiency.

The nature of the radiation control sheet materials or articles hereof, including the features, properties and advantages thereof, will be better understood by reference to the detailed description of the invention provided hereinafter and the accompanying drawings.

DETAILED DESCRIPTION OF THE INVENTION

As indicated above, this invention is directed to radiation control sheet materials or articles adapted to window and other solar applications. These radiation control sheet materials include a suitable transparent support material, infrared radiation-reflecting means and an adherent and protective polymeric layer substantially transmissive of infrared radiation. These radiation control articles permit the transmission of visible radiation through the several layers thereof while selectively reflecting infrared radiation, particularly long-wave (thermal) radiation.

It will be appreciated that depending upon the particular nature of the infrared radiation-reflecting material, as a metal, metalloid or semiconductive material, applications of such sheet materials or articles can be varied to suit particular applications. Thus, such articles can be utilized in applications where solar energy is desirably allowed to be transmitted therethrough through into the interior of a building while the resulting re-radiated long-wave (heat) energy is prevented from escape by being reflected from the infrared radiation-reflecting material into the building interior. The object of such utilization is to realize a building interior heat gain.

A suitable radiation control article for this purpose is, for example, a sheet material which transmits radiation over the entire Solar Air Mass-2 (AM-2) spectrum, including the non-visible infrared radiation of the AM-2 spectrum, while being reflective of radiation primarily of long wavelength (e.g. from 3 to 100 microns). The AM-2 spectrum is the distribution of energy from the sun available after it has been filtered by two earth air masses.

If desired, a radiation control sheet material can be designed to known manner to transmit visible radiation into a building interior while repelling (by reflection against the infrared radiation-reflecting layer of the film) certain infrared radiation which, if allowed to enter the building interior, would result in re-radiated long-wave (heat) radiation. Such applications permit a reduction in heat load and permit more effecient operation of air conditioning systems used for desired cooling.

A suitable radiation control article for this purpose is, for example, a sheet material which transmits light in the visible region (e.g., 0.4 to 0.7 micron) of the AM-2 spectrum while reflecting non-visible, infrared radiation in the 0.7 to 3.0 micron region of the spectrum.

The polymeric protective layers hereof can by use of an isocyanate adhesion-promoting agent be made to bond effectively to a variety of radiation control sheet materials, inclusive of the types hereinbefore described, for the realization of superior physical and optical properties. The components and materials utilized in the manufacture of the radiation control articles hereof and the manner in which these components and materials are employed in the fabrication of such articles is described in greater detail below.

Figure 1:
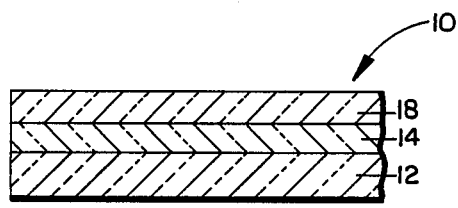
FIG. 1 is a diagrammatic, enlarged cross-sectional view of a radiation control sheet material of the invention including a transparent support carrying an infrared radiation-reflecting layer and a protective polymeric layer substantially transmissive of infrared radiation.

Reference is now made to the accompanying drawings wherein like numbers, appearing in the figures, refer to like components. In FIG. 1, there is shown a radiation control article 10 of the invention comprising a transparent support material 12 carrying a layer of infrared radiation-reflecting material 14 and having thereon a protective (outermost)polymeric layer substantially transmissive to infrared radiation and including an adhesion-providing isocyanate. Support material 12 can comprise any of a variety of transparent materials including glass, cellulose esters such as nitrocellulose, cellulose acetate or cellulose acetate butyrate, polyesters, polycarbonates, vinylic polymers such as acrylics or vinyl chloride-acetate copolymers, or other materials that can be provided in a sheet-like light-transmissive form. Support material 12 can be rigid, semi-rigid or flexible. While glass can be suitably employed, it will be appreciated that polymeric films, particularly polyesters such as polyethylene terephthalate, will be especially preferred from the standpoints of low cost and ease of handling in manufacture and application. Thus, particularly where retrofitting applications for existing buildings is contemplated, a low cost transparent polyethylene terephthalate material will be a preferred support material. The thickness of the support material can vary to meet a particular application, although sheet-like support materials having a thickness of from about 0.1 mil to about 500 mils can be employed with good results.

Infrared radiation-reflecting means 14 can comprise a metal such as gold, silver, copper, aluminum or nickel as commonly used in the production of heat-reflecting window pane or glazing materials. The choice of a particular metal employed may be dictated by the particular application and desired optical characteristics and performance. Metallic alloys such as nickel-chrome can also be used. A preferred metallic material is silver which provides good infrared-reflecting properties and low absorption in the visible range. Metalloid or metal-like materials which provide infrared radiation-reflecting properties can also be used. Examples include selenium and tellurium. Semiconductor materials such as cadmium stannate, indium oxide and tin oxide can also be used for their infrared-reflecting properties. These semiconductor materials can be doped or undoped, suitable dopants including tin or fluorine. A preferred material is tin-doped indium oxide.

Typically, infrared radiation-reflecting means 14 will be present on support material 12 in the form of a layer, such as can be provided by known deposition methods. If desired, however, the infrared radiation-reflecting material can be employed in the form of a grid pattern or arrangement. Grid spacing sufficient to permit transmission of visible light while causing longer wavelength radiation to be reflected can be employed. For example, grid spacing of about 2.5 microns can be utilized for this purpose.

Where infrared radiation-reflecting means is desirably used in the form of a layer, such layer can be deposited onto support material 12 by resort to known methods for such deposition. A preferred method involves vacuum deposition of metallic vapor according to known technique. This method permits thin and uniform layers to be conveniently deposited. Chemical deposition methods can, however, also be employed as suited to the particular metal desired.

Infrared radiation-reflecting layer 14 can be deposited onto substrate material 12 as a layer having a thickness which, in general, will be in the range from about 50 to 5000 Angstroms. The layer thickness will vary with the particular nature of the metal, metalloid or semiconductor material employed and the desired optical characteristics or properties. For example, a metallic layer of silver of about 100 to 250 Angstroms in thickness provides desired infrared radiation-reflecting properties consistent with the desire for low absorption or attenuation in the visible range.

It will be appreciated that the material employed as layer 14 to provide infrared radiation-reflecting properties and performance will depend upon the particular properties desired in a radiation-control sheet material and especially the intended application. Accordingly, silver may be suitably employed for heat gain applications while copper may be preferred where the dictates of reduced heating load apply. Thus, particular transmission and reflectance properties and transition wavelength will influence selection of a suitable infrared-reflecting layer 14 to suit requirements.

If desired, infrared radiation-reflecting layer 14 can incorporate additional materials for stablilization against oxidation. For example, indium, aluminum, gold, copper or other metals can be used for this purpose. In addition, support material 12 can be treated to promote adhesion of the infrared radiation-reflecting material thereto and thereby minimize incidence of cracking or breaking of the deposited film. Corona discharge or ion-bombardment techniques can be used for this purpose. Alternatively, a layer of adhesive (not shown) can be employed between support or substrate material 12 and infrared radiation-reflecting layer 14 to serve as a tie-coat or adhesion-promoting material.

Figure 2:
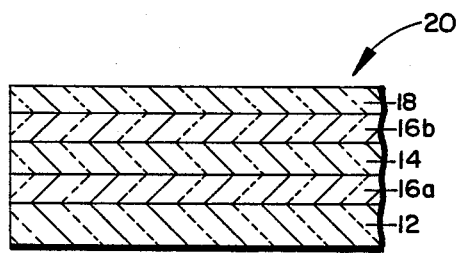
FIG. 2 is a diagrammatic, enlarged cross-sectional view of a preferred structure of radiation control sheet material of the invention including a transparent support carrying a layer of infrared radiation-reflecting material sandwiched between a pair of dielectric layers for improved solar transmission and a protective polymeric layer substantially transmissive of infrared radiation.

Referring now to FIG. 2, there is shown a preferred structure of radiation control article 20 including dielectric layers 16a and 16b. According to this preferred embodiment, dielectric layers 16a and 16b comprise high index of refraction dielectric materials which improve transmission of visible and other solar radiation. In the preferred structure shown in FIG. 2, either of layers 16a or 16b can be omitted, although it will be preferred to include both such layers so as to provide a sandwich comprising infrared radiation-reflecting layer 14 between dielectric layers 16a and 16b.

Dielectric layers 16a and 16b can be deposited using known vacuum deposition methods, although chemical deposition methods can also be suitably employed. Suitable materials useful for the provision of layers 16a and/or 16b include, for example, the oxides, nitrides, borides and silicides of titanium, tungsten, tin, cerium, indium vanadium and molybdenum. Zinc sulfide, bismuth oxide, zinc oxide, zirconium oxide and lead chloride can also be employed. Preferred materials include titanium dioxide, indium oxide, zinc sulfide and tin oxide. Examples of useful dielectric materials which absorb ultraviolet solar radiation include cerium oxide and titanium dioxide.

Dielectric layers 16a and 16b have higher indices of refraction for visible light than the infrared radiation-reflecting material 14 and by their anti-reflection character improve transmission of solar energy through the article containing such layers. In general, the index of refraction of layers 16a and 16b will be greater than 1.6 and preferably greater than 2. The thickness of layers 16a and/or 16b will generally be in the range of about 50 to about 800 Angstroms, although thickness will vary depending upon the infrared radiation-reflecting material 14 utilized and consistent with the desired objective of increasing transmission. If desired, the thickness of layers 16a and/or 16b can be varied to effect an adjustment or modulation of the wavelength at which a transition between transmission and reflection is observed. Preferred thicknesses are in the range of from about 80 to about 500 Angstroms.

Examples of infrared-reflecting and high index dielectric materials, including sandwich arrangements thereof, are known and examples thereof which can be utilized in the production of radiation control articles hereof can be found in U.S. Pat. No. 3,889,026 (issued June 10, 1975 to R. Groth); in Great Britain Patent No. 2,012,943; and in U.S. Pat. No. 4,337,990 (issued July 6, 1982 to J.C.C. Fan et al)

In the embodiments shown in FIGS. 1 and 2, layer 18 comprises a polymeric protective overlayer containing an adhesion-promoting isocyanate. Layer 18 serves certain essential functions in protecting the article against abrasion and in providing corrosion resistance for the infrared-reflecting material 14, usually of metal or metal-like material. The isocyanate adhesion-promoting agent provides important functionality in minimizing delamination of layer 18 or the development of other defects associated with adhesion failure, e.g., discontinuities and corrosion resulting therefrom.

Layer 18 is characterized by being substantially transmissive of infrared radiation, e.g., substantially transmissive of radiation in the range of from 0.7 to 50 microns. Thus, long-wave (heat) radiation from a building interior can be transmitted through layer 18 for reflection against infrared radiation-reflecting layer 14 and, in turn, retransmission into the building interior. It will be appreciated that the polymeric material utilized for the production of layer 18 will desirably be nonabsorbing of infrared radiation or will exhibit minimal absorption for such radiation so as to maximize transmission therethrough of infrared radiation. The transmission of infrared radiation through layer 18 will depend upon the nature of the polymer utilized and the thickness and absorption characteristics thereof. Where the polymer exhibits low absorption of infrared radiation, a thicker layer can be utilized which may enhance the protective capacity of the layer. Similarly, low coverage or thickness will be employed where the polymer of layer 18 exhibits appreciable infrared radiation-absorbing properties.

Examples of polymers useful in the provision of a protective layer exhibiting substantial transmission of infrared radiation include fluorinated polymers, such as the vinylidene fluoride homopolymers and copolymers, perfluorinated polyolefins and fluorinated acrylates and methacrylates; styrene polymers including copolymers of styrene and a copolymerizable monomer, such as the styrene-acrylonitrile copolymers; polymers such as polyvinyl butyral and polyvinyl chloride; and polyolefins, such as polyethylene.

Preferred polymers for use in providing protective layer 18 are fluorinated polymers which possess several advantageous properties. The fluorinated polymers permit production of a durable and abrasionresistant protective surface and can be conveniently coated from solution at low temperatures such that plastic substrate materials can be employed. In addition, the fluorinated polymers have a low index of refraction such that an antireflection layer can be readily provided.

Many known fluorinated polymers can be suitably employed in the protection coating materials used for the production of the radiation-control articles of the present invention. Preferably, these fluorinated polymers exhibit an index of refraction of about 1.3 to 1.45, and more preferably, from about 1.35 to about 1.40. Examples of such fluorinated polymers include the perfluorinated polyolefins having an index of refraction of about 1.35 to about 1.45, e.g., polytetrafluoroethylene, such as disclosed in U.S. Pat. No. 3,617,354. Other fluorinated polymers which can be used to provide a protective overlayer for the articles hereof include poly-(1,1-dihydropentadecafluoro-octyl acrylate) with an index of refraction of about 1.38; poly-(1,1-dihydropentadecafluorooctyl methacrylate) with an index of refraction of about 1.38; a polymer having the repeating units of the following structure

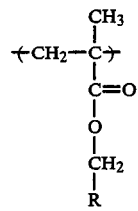

wherein R is perfluoro-cyclohexyl (—$C_6F_{11}$); Kynar 7201 (tradename of Pennwalt Chemical Co. for a copolymer of vinylidene fluoride and tetrafluoroethylene); Kel F Elastomer 3700 (tradename of 3M Company for a 50/50 copolymer of vinylidene fluoride; dehydrofluorinated polyvinylene fluoride; Fluoropolymer B (tradename of E. I. du Ponte de Nemours for a 70/20/10 copolymer of vinylidene fluoride, tetrafluoroethylene and vinylbutyrate); and Viton A (tradename of E. I. du Ponte de Nemours for a 30/70 copolymer of hexafluoropropylene and vinylidene fluoride). Vinylidene fluoride polymers and copolymers are particularly useful and preferred herein The thickness of protective layer 18 can vary with the nature of the polymer, which can be applied by the coating of a solution of polymer or by the lamination of a polymer film. In general, the thickness of protective layer 18 will be in the range of about 0.08 to about 25 microns. Preferably, the thickness will be in the range of about 0.1 to 4.0 microns. In some cases, protective layer 18 can be employed to advantage in permitting an adjustment or modulation of the wavelength at which transition occurs between the reflection and transmission characteristics of the infrared radiation-reflecting layer 14 of the articles hereof. This can be accomplished by adjusting the thickness of polymeric layer 18. Where, for example, in an embodiment of the type illustrated in FIG. 2, layers 16a, 14 and 16b comprise an interference filter-arrangement of titania/silver/titania, polymer layer 18 can be adjusted in thickness to effect a change in the wavelength at which a transmission/reflectivity transition occurs. Such adjustment, thus, permits the transmission and reflection properties of the article to be adapted to particular requirements and intended applications.

As indicated previously, layer 18 can also provide antireflection properties depending upon the nature of the polymer thereof, especially the index of refraction of the polymer layer. For example, in an embodiment of the type illustrated in FIG. 1, and where, for example, transparent substrate 12 is provided with an infrared radiation-reflecting layer 14 of tin-doped indium oxide (having an index of refraction of about 2.1 or 2.2), performance can be improved as to visible light transmission properties by the use of a fluorinated polymer-containing layer 18 which provides antireflection properties The principles of physics by which anti-reflection coatings function are well known and are applicable to the radiation-control articles of the present invention. Thus, it is well known that application of a single layer transparent coating will reduce surface reflection from a contiguous and underlying transparent layer if the refractive index of the coating is less than that of the transparent layer to which it is applied and the coating is of appropriate optical thickness.

In the radiation-control articles with which this invention is concerned, an anti-reflection polymer coating will normally be in optical contact with air. Under these circumstances, and because the index of refraction of air is approximately 1, the applicable principles of physics give the following rule: if the index of refraction of the coating material (candidate antireflection layer) is exactly equal to the square root of the index of refraction of the transparent layer to which it is applied, then all surface reflection of light will be elminiated for that wavelength at which the product of the refractive index times thickness is equal to one-quarter of the wavelength. At other wavelengths the destructive interference between light reflected from the top and bottom surfaces of the anti-reflection coating is not complete but a substantial reduction in overall reflectivity is obtained. By selecting the optical thickness of the anti-reflection coating to be one-quarter of a wavelength for approximately the midpoint of the visible light wavelength range (i.e., one-quarter of 5500 Angstroms or about 1400 Angstroms), the reduction in reflectivity is optimized. The term "optical thickness" as used herein refers to the product of the physical thickness of the coating times the refractive index of the coating material The optimum index of refraction to be exhibited by an antireflection layer of protective polymer hereof can be readily calculated by the principles of physics previously discussed, but it is not essential that the optimum value be used in order to obtain very beneficial results. Where the protective polymer hereof is used as an antireflection layer, the index of refraction of the polymer layer will preferably be at least 0.20 lower than the index of refraction of the contiguous layer on which the polymer layer is deposited.

The above discussion of antireflection polymer layers has been in terms of coatings or layers of one-quarter wavelength thickness for visible light. In general, such antireflection layer will have an optical thickness in the range of from about 0.10 to about 0.17 micron and more preferably from about 0.125 to about 0.150 micron, or a preferred physical thickness of about 0.089 to about 0.107 micron.

Protective overlayer 18 can be applied to a radiation-control sheet material in a variety of ways. Thus, the polymer layer can be applied over infrared radiation-reflecting layer 14 (or over dielectric layer 16b in the case of the preferred embodiment of FIG. 2) by coating the polymer from a solvent, by a lamination technique, by vacuum deposition technique or by the in situ polymerization of a corresponding monomer. A preferred and convenient method involves application of the polymer by coating from a suitable solvent material. Thus, the polymer can be applied to an article hereof by a preferred method whereby the polymer, along with any other agent that may be utilized therewith, is dissolved in a suitable organic solvent and then coated by resort to dip coating, roll coating, slot coating or other suitable coating technique. Preferred solvents for the coating of fluorinated polymers include the ketonic solvents such as methyl propyl ketone although other solvents such as Freon TF, trifluorobenzene and hexafluoro para-xylene can also be used. Other solvents can be used depending upon the polymer used for the provision of protective overlayer 18. In general, about 2% by weight of the polymer in the solvent will be employed with satisfactory results.

Protective layer 18 can be formed from a mixture of polymers. For example, it may be desired to include in a fluorinated polymer-containing layer 18 a content of non-fluorinated polymer, particularly an acrylic polymer such as polymethyl methacrylate, to provide improved adhesion, abrasion resistance or other desired properties. In general, where the fluorinated polymer is utilized to provide antireflection properties, the non-fluorinated polymer material, depending upon the index of refraction thereof, will be used in a minor proportion so as not to undesirably increase the index of refraction of the polymer layer. A polymer blend including, for example, polymethyl methacrylate up to about 30% by weight can be employed. Other polymer mixtures can, however, be used to provide a suitable polymeric protective overlayer 18.

Protective layer 18 is provided in an adherent form by the use of an isocyanate adhesion-promoting agent. It has been found that the isocyanate promotes the formation of a layer of polymer which is strongly bonded to the infrared radiation-reflecting layer 14, or in the case of the preferred embodiment of FIG. 2, to dielectric layer 16b. Generally, it will be preferred to include the isocyanate adhesion-promoting agent as a component of the polymer-containing coating solution or fluid utilized for deposition of polymer layer 18. The isocyanate can however, be deposited as a discrete layer (not shown) onto which the polymer layer can be deposited. The amount of isocyanate adhesion-promoting agent used in a coating solution can vary depending upon the nature of infrared radiation-reflecting material 14 or dielectric material 16b. In general, the isocyanate is used in a ratio of about 2.5% to about 7.5% by weight based upon the polymer solids in the coating solution or fluid. Preferably, the coating solution contains about 1 to about 2% of the adhesion-promoting isocyanate. Good results can be obtained, for example, where the isocyanate is applied at a coverage of about 1 to 30 mgs./ft.$^2$ (about 10.8 to about 323 mgs./m.$^2$).

A variety of isocyanate materials can be used including aliphatic isocyanates and aromatic isocyanates. Diisocyanates, polyisocyanates including oligomeric isocyanates, and isothiocyanates can be employed and are intended as being included with the term "isocyanate" as used herein. Examples of suitable isocyanates include methylene-bis-(4-phenylisocyanate), also known as MDI; phenylisocyanate; 3,3-dimethoxy-4,4-biphenyl diisocyanate; hexamethylene diisocyanate; hexyl isocyanate; n-butyl isothiocyanate; butyl isocyanate; and toluene diisocyanate, also known as TDI. Examples of polyisocyanates that can also be employed include those having the formula

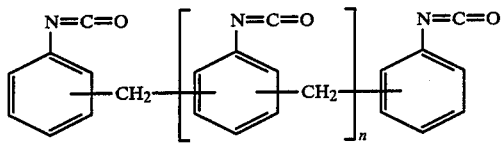

These materials are commerically available under the tradename designations PAPI, PAPI-50, PAPI-135 and PAPI-901.

It has been found that the isocyanate is particularly advantageous from the standpoint of providing a strongly adherent polymer layer 18 and that failure to use the isocyanate agent in some instances produces a layer which is readily removed by rubbing or abrasion.

As mentioned previously, agents intended to provide one or more desired functions can be included in polymer layer 18. For example, UV stabilizers can be included to provide stability of the polymer layer against the degradative effects of ultraviolet radiation. A dimethyl siloxane polymer can be included as a leveling agent or for improved coatability and to provide improved abrasion resistance. Such material permits the production of a protective layer which can tolerate an increased level of abrasion. Such advantage is believed in part to be attributable to a lowering of coefficient of friction by reason of the presence of the siloxane polymer.

The dimethyl siloxane polymers useful in this invention are fluids and have repeating units of the structure

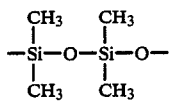

The polydimethyl siloxanes have an index of refraction very close to that of the fluorinated polymers and are especially suited in combination therewith. Suitable polydimathyl siloxane polymers are those available from Dow Corning Corp., Midland, Mich., under the tradename "Dow Corning 200 Fluid" as fluids having viscosities varying from 0.65 to 100,000 centistokes The polydimethyl siloxane polymer may also be used in the form of a paste containing finely divided silica, such as that sold by Dow Corning Corp as "Dow Corning Stop Cock Grease".

The polydimethyl siloxane is added to a polymer coating solution in a quantity approximately 0.2 to 4.0% and preferably 0.5 to 3.0%, by weight of the total solids in the coating solution. The quantity of polydimethyl siloxane appropriate for any particular polymer coating composition may be determined by routine experimentation. The polydimethyl siloxanes are soluble, for example, in solvents useful in coating fluorinated polymers and give homogeneous coatings with fluorinated polymers. If silica is present it should be less than 100 m$\mu$ in diameter so as not to interfere with obtaining smooth coatings as thin as a quarter wave.

In the embodiments shown in FIGS. 1 and 2, a protective polymeric layer 18 is shown as an outermost protective layer for the layers 14, 16a and 16b shown therein. If desired, an additional polymer-containing layer (not shown) can be applied to support material 12 on the side thereof opposed from such layers. Such additional layer provides an article protected at both outermost surfaces from the harmful effects of abrasion and environmental corrosive influences. A preferred layer for this purpose is a fluorinated polymer-containing protection layer applied at a quarter-wave optical thickness for visible light.

If desired, an adhesion layer (not shown) can be applied, in the embodiments shown in FIGS. 1 and 2, to support material 12 on the side thereof opposed to illustrated layers 14, 16a and 16b. Such an adhesive layer can be moisture-activatable to facilitate attachment of the radiation-control article, for example, to the interior surface of existing glazing, according to a preferred retrofitting application of the articles hereof. Alternatively, an adhesive layer (not shown) can be applied over polymeric layer 18 to permit attachment to the interior surface of existing glazing, e.g., glass. Such utilization may be desired in applications where it is desirable to repel, by reflection from the infrared radiation-reflecting material, certain infrared radiation of the solar spectrum, e.g., infrared solar radiation of up to about 3 microns wavelength transmitted by the glazing material and polymeric layer 18. This application permits reduction in heat load and more efficient operation of air conditioning systems.

The following examples further illustrate the preparation of radiation-control sheet materials of this invention. These examples are intended to be merely illustrative and not limitative.

EXAMPLE 1

Onto a transparent three-mil (0.23 mm.) polyethylene terephthalate support material was deposited (by vacuum deposition technique) a layer of gold of 60 Angstrom thickness. The gold layer was then coated (by spin coating) with a composition containing by weight: 989.0 parts of methyl propyl ketone (dry), 6.05 parts of Kynar 7201 (tradename of Pennwalt Chemical Co. for a copolymer of vinylidene fluoride and tetrafluoroethylene), 1.65 parts Kel F Elastomer 3700 (tradename of 3M Company for a 50/50 copolymer of chlorotrifluoroethylene and vinylidene fluoride and 3.30 parts of poly (methyl methacrylate), to which were added 1.65 parts of Hylene M-50 (tradename of E.I. du Pont de Nemours for a 50% by weight solution of undistilled methylene-bis-(4-phenyl-isocyanate) in monochlorobenzene) and 0.09 part of Dow Corning 200 Fluid (tradename of Dow Corning Corp. for a dimethyl siloxane polymer of 10,000 centistoke viscosity). The dried coating had an optical thickness of one quarter wave for a wavelength of approximately 0.9 micron. The coating showed good abrasion resistance when the coating was rubbed vigorously with a dry Kleenex brand facial tissue. This abrasion resistance was a dramatic improvement over a control sample of the same support material carrying the same gold deposited layer but not overcoated with the coating composition hereof. The gold layer of the control sample was readily scratched by the rubbing thereof with the dry facial tissue and the gold was easily removed from the support material.

Thermal reflectance measurements of the coatings were made in the case of the radiation-control sheet material of this Example and the control sample (having no overcoat layer). The reflectance measurements were conducted at wavelengths of five, ten and 15 microns, respectively, with the results reported as follows in Table 1:

TABLE 1

| SAMPLE | REFLECTANCE (in %) | | |
|---|---|---|---|
|  | 5μ | 10μ | 15μ |
| Example 1 | 44 | 43 | 42 |
| Control | 34 | 41 | 38 |

Transmission characteristics of the same samples were measured. The samples showed virtually the same transmission over the visible spectrum (approximately 0.4 to 0.7 micron).

EXAMPLE 2

A solar control film designed for the purpose of reducing heat load by reflection and/or absorption of a significant portion of non-visible solar radiation incident thereto was provided with a protective coating of fluorinated polymer in the manner described in EXAMPLE 1. The solar control film was comprised of a one-mil (0.025 mm.) polyethylene terephthalate support material carrying a layer of copper as an infrared radiation-reflecting layer. The protective layer of fluorinated polymer was applied over the copper layer using the method and coating composition described in EXAMPLE 1. The protective layer was an antireflection layer having an optical thickness of one quarter wave for a wavelength of approximately 0.50 micron. The resulting radiation-control sheet material was compared with a control sample which had not been provided with the protective polymer layer. Compared with the uncoated sample, which showed transmission at 0.5 micron of 45%, the coated article of this EXAMPLE (hereinafter referred to as the test material) showed transmission of 57%. The increased visible transmission of the test material is attributable to reduced reflectance; the test material showed a reflectance of 13% at 0.5 micron while the uncoated control sampled showed a reflectance at 0.5 micron of 25%.

The test and control samples were further evaluated using accelerated corrosion tests according to the following methods:

1. Test and control samples were suspended in the headspace of a sealed container of a solution of sodium disulfide in water. The container was kept at room temperature. After a 16-hour period, the samples were removed for evaluation. The test sample was relatively unaffected, showing only slight deterioration of the metallic layer in the form of isolated spots. These spots are believed to correspond to minute pinhole-like discontinuities in the protective coating. In contrast, the control sample showed large areas of deterioration marked primarily by discoloration.

2. Test and control samples were suspended in the headspace of a sealed container of sodium hypochlorite solution. After a 24-hour period, the samples were removed for evaluation. The control sample showed massive deterioration and loss of color. In contrast, the test sample showed little sign of attack and virtually no discoloration. Thermal reflectivity measurements showed a loss of nearly all thermal reflectivity in the case of the control sample while nearly all reflectivity was retained in the case of the test sample.

3. Test and control samples were suspended in the headspace of a sealed container of sodium chloride solution maintained at 38° C. After a 40-hour period, the samples were removed for evaluation. The test sample showed relatively little deterioration; the control sample showed numerous signs of attack marked by discoloration.

EXAMPLE 3

A radiation-control film was prepared in the manner described in EXAMPLE 2, except that, in addition to the layer of fluorinated polymer coated over the copper layer, a layer of one-quarter wave optical thickness of fluorinated polymer was coated on the opposed side of the polyester support material. Further improvement in transmission was realized.

EXAMPLE 4

A radiation-control article of the invention, including a titania/silver/titania interference stack, was prepared in the following manner. A layer of titanium dioxide was deposited under partial vacuum onto a three-mil (0.076 mm.) support material. The titanium dioxide layer was deposited at a thickness of 100 Angstroms. A layer of silver (of 80-Angstrom thickness) was deposited over the titanium dioxide layer. A second layer of titanium dioxide, of 100-Angstrom thickness, was then deposited over the silver layer.

The coating solution described in EXAMPLE 1 was used to provide a layer (of one-quarter wave optical thickness for a wavelength of 0.55 micron) of fluorinated polymer over the titania/silver/titania sandwich arrangement. The resulting article, in the configuration shown in FIG. 2, was evaluated against a control sample which had not been coated with the fluorinated polymer. Transmission results are shown in the following Table 2:

TABLE 2

| SAMPLE | TRANSMISSION (in %) | | | | |
|---|---|---|---|---|---|
|  | 0.55μ | 0.6μ | 0.8μ | 1.0μ | 1.2μ |
| Example 4 | 84 | 83 | 67 | 50 | 37 |
| Control | 74 | 66 | 50 | 39 | 32 |

As can be seen from the data presented in Table 2, the presence of a fluorinated polymer layer in the article of this Example provided increased transmission relative to the control sample having no fluorinated polymer overcoat layer.

Thermal reflectivity evaluation of the test and control samples was conducted. Over the range of 3 to 20 microns, reflectivity remained relatively unchanged at about 82% for both test and control samples.

Test and control samples were suspended for a four-hour period in the headspace of a sealed container of sodium sulfide solution. Evaluation of the samples showed the test sample to be apparently unaffected (no color change) while the control sample changed from its initial grey-blue color to a yellowish coloration indicative of silver sulfide formation. No change in thermal reflectance occurred in the case of the test sample. In contrast, the control sample (over the same range of 3 to 20 microns) showed a marked reduction (to less than 10% from an initial 82%) in thermal reflectivity.

EXAMPLE 5

A radiation-control film was prepared in the manner described in EXAMPLE 4, except that, in addition to the layer of fluorinated polymer coated over the titania/silver/titania layers; a layer of one-quarter wave optical thickness of fluorinated polymer was coated on the opposed side of the polyester support material. Further improvement in transmission was realized.

EXAMPLE 6

A radiation-control article was prepared by coating a protective fluorinated polymer over a glass substrate (approximately 3.2 mm. thickness) carrying an infrared radiation reflecting layer of indium oxide. The protective layer was provided by applying the fluorinated polymer-containing described in EXAMPLE 1 in the manner there described. The layer was coated at a one-quarter wave optical thickness for a wavelength of approximately 0.50 micron.

The resulting article was compared with a control sample which had not been provided with the protective polymer layer. Transmission and reflectance results are reported, respectivley, in TABLES 3 and 4 as follows:

TABLE 3

| SAMPLE | TRANSMISSION (in %) | | |
| --- | --- | --- | --- |
|  | $0.45\mu$ | $0.55\mu$ | $0.65\mu$ |
| Example 6 | 91 | 91 | 86 |
| Control | 79 | 85 | 72 |

TABLE 4

| SAMPLE | REFLECTANCE (in %) | | |
| --- | --- | --- | --- |
|  | $5\mu$ | $10\mu$ | $15\mu$ |
| Example 6 | 84 | 81 | 80 |
| Control | 82 | 84 | 85 |

As can be seen from the results reported in TABLES 3 and 4, the application of a fluorinated polymer-containing protective overlayer provided in the case of the article of the invention (versus the Control sample) a substantial increase in transmission (TABLE 3) without a substantial reduction in heat reflecting properties (TABLE 4).

EXAMPLE 7

Onto a radiation control article comprising a polyester support carrying a titania/silver/titania interference arrangement of layers was coated a fluorinated polymer-containing protective coating such that the resulting article (hereinafter, the test article) contained the structure illustrated in FIG. 2. The protective coating was applied by spin coating a composition containing by weight: 517.92 parts of methyl propyl ketone (dry), 3.355 parts of Kynar 7201 (tradename of Pennwalt Chemical Co. for a copolymer of vinylidene fluoride and tertrafluoroethylene) 1.586 parts Kel F Elastomer 3700 (tradename of 3M Company for a 50/50 copolymer of chlorotrifluoroethylene and vinylidene fluoride and 1.815 parts of poly (methyl methacrylate) and 0.142 part of Dow Corning 200 Fluid (tradename of Dow Corning Corp. for a dimethyl siloxane polymer of 10,000 centistoke viscosity), to which was added 0.015 part of Hylene M-50 (tradename of E. I. du Pont de Nemours for a 50% by weight solution of undistilled methylene-bis-(4-phenyl-isocyanate) in monochlorobenze). The coating was dried using hot air to provide a protective coating having an optical thickness of one quarter wave for a wavelength of approximately 0.55 micron.

For purposes of comparison, a control sample was prepared by coating a sample of the radiation control article with a protective coating using the coating composition and method as described in this Example, except that, no Hylene-M-50 (isocyanate) was included in the coating composition. Both the test and control articles were subjected to an adhesion-failure test as follows:

A strip of one-half inch wide (12.7 mm.) Scotch brand cellophane tape was adhered to the protective coat of each of the test and control samples. The tape was then removed from each sample with a jerking motion. The test sample showed no evidence of adhesion failure. In the case of the control sample, by contrast, removal of the cellophane tape caused an adhesion failure, apparent from the presence of discontinuities in the protective layer in areas where tape had been secured.

The test and control samples were subjected to an abrasion test using a dry Kleenex brand facial tissue in the manner described in EXAMPLE 1. The test sample was not marred by the rubbing; in contrast, defects caused by removal of protective coating were evident in the case of the control sample.

EXAMPLE 8

Onto a radiation control article (comprising a polyester support carrying an indium oxide/silver/indium oxide interference arrangement of layers) was coated a styrene-acrylonitrile copolymeric protective layer such that the resulting article (hereinafter, the test article) conformed to the structure illustrated in FIG. 2.

The protective layer was applied to the radiation-control article by coating a composition which was prepared in the following manner. To 90 cc. of methylpropyl ketone was added 11.0 gm. of Tyril 880 B (Dow Chemical tradename for a high molecular weight styreneacrylonitrile copolymer). Additional methyl propyl ketone was added to provide a volume of 100 cc and the resulting solution was heated under a nitrogen atmosphere to 70° C. under reflux. To the resulting solution, 0.6 cc. of Hylene M-50 (tradename of E. I. du Pont de Nemours for a 50% by weight solution of undistilled methylene-bis-(4-phenyl-isocyanate) in monochlorobenzene) was added and the resulting coating composition was coated (to a coverage of approximately 5382 mgs./m.$^2$) at a rate of 18 cc./min. onto the radiation-control which had been preheated to a temperature of 93.3° C. (200° F.) and which was moving at a web speed of 3.05 m./min. Approximately five minutes after application of the coating composition, hot air was impinged on the coated article for the drying thereof.

For purposes of comparison, a control sample was prepared by coating a sample of the radiation control article with a protective coating using the coating composition and method as described in this Example, except that, no Hylene-50 (isocyanate) was included in the coating composition. Each of the test and control samples was evaluated for thermal reflectivity over wavelengths in the range of 5 to 15 microns. In each case, such reflectivity was greater than 80%.

Both the test and control articles were subjected to an adhesion-failure test as follows: A strip of one-half inch wide (12.7 mm.) Scotch brand cellophane tape was adhered to the protective coat of each of the test and control samples. The tape was then removed from each sample with a jerking motion. The test sample showed no evidence of adhesion failure. In the case of the control sample, by contrast, removal of the cellophane tape caused an adhesion failure, apparent from the presence of discontinuities in the protective layer in areas where tape had been secured.

What is claimed is:

1. A radiation-control sheet material comprising: a transparent support carrying means for reflecting infrared radiation; and as a protective outer layer for said radiation-control sheet material, a polymeric layer substantially transmissive of infrared radiation, said polymeric layer having therein or as a layer contiguous thereto an effective amount of an isocyanate adhesion-promoting agent.

2. The radiation-control sheet material of claim 1 wherein said protective outer layer has a physical thickness of about 0.08 micron to about 25 microns.

3. The radiation-control sheet material of claim 2 wherein said protective outer layer has a thickness in the range of about 0.1 micron to about 4 microns.

4. The radiation-control sheet material of claim 1 wherein said transparent support is a polyester sheet material.

5. The radiation-control sheet material of claim 1 wherein said means for reflecting infrared radiation comprises a layer of silver.

6. The radiation-control sheet material of claim 1 wherein said means for reflecting infrared radiation comprises a layer of tin-doped indium oxide.

7. The radiation-control sheet material of claim 1 wherein said isocyanate adhesion-promoting agent comprises methylene-bis-(4-phenyl-isocyanate).

8. The radiation-control sheet material of claim 1 wherein fluorinated polymer-containing layer is additionally present on the opposed side of said support.

9. The radiation-control sheet material of claim 1 wherein said polymeric layer substantially transmissive of infrared radiation comprises a fluorinated polymer having an index of refraction in the range of about 1.3 to about 1.45.

10. The radiation-control sheet material of claim 1 wherein said polymeric layer substantially transmissive of infrared radiation comprises a fluorinated polymer.

11. The radiation-control sheet material of claim 10 wherein said fluorinated polymer comprises a vinylidene fluoride copolymer.

12. The radiation-control sheet material of claim 11 wherein said vinylidene fluoride copolymer comprises a copolymer of vinylidene fluoride and chlorotrifluorethylene.

13. The radiation-control sheet material of claim 11 wherein said vinylidene fluoride copolymer comprises a copolymer of vinylidene fluoride and tetrafluoroethylene.

14. The radiation-control sheet material of claim 1 wherein said protective outer layer includes a dimethyl siloxane polymer.

15. The radiation-control sheet material of claim 14 wherein said dimethyl siloxane polymer is present in said protective outer layer in an amount effective to provide said layer with abrasion resistance.

16. A radiation-control sheet material comprising: a transparent support carrying means for reflecting infrared radiation and at least one antireflection layer of dielectric material contiguous thereto; and as an outer protective layer for said radiation-control sheet material, a polymeric layer substantially transmissive of infrared radiation, said polymeric layer having therein or as a layer contiguous thereto an effective amount of an isocyanate adhesion-promoting agent.

17. The radiation-control sheet material of claim 16 wherein said isocyanate adhesion-promoting agent comprises methylene-bis-(4-phyenyl-isocyanate.

18. The radiation-control sheet material of claim 16 wherein said protective outer layer has a thickness of about 0.1 micron to about 4 microns.

19. The radiation-control sheet material of claim 16 wherein a fluorinated polymer-containing layer is additionally present on the opposed side of said support.

20. The radiation-control sheet material of claim 16 wherein said polymeric layer includes a dimethyl siloxane polymer.

21. The radiation-control sheet material of claim 20 wherein said dimethyl siloxane polymer is present in said protective outer layer in an amount effective to provide said layer with abrasion resistance.

22. The radiation-control sheet material of claim 16 wherein said transparent support material comprises a polyester.

23. The radiation-control sheet material of claim 22 wherein said means for reflecting infrared radiation comprise a layer of silver.

24. The radiation-control sheet material of claim 23 wherein an antireflection layer of dielectric material is contiguous to each side of said silver layer, thereby to comprise a sandwich arrangement of said silver between two said dielectric material layers.

25. The radiation-control article of claim 24 wherein each said layer of dielectric material is a layer of titanium dioxide.

26. The radiation-control article of claim 16 wherein said polymeric layer substantially transmissive of infrared radiation comprises a fluorinated polymer.

27. The radiation-control sheet material of claim 26 wherein said layer of fluorinated polymer is an antireflection layer.

28. The radiation-control sheet material of claim 27 wherein said fluorinated polymer has an index of refraction in the range of about 1.3 to about 1.45.

* * * * *